United States Patent Office 3,332,215
Patented July 25, 1967

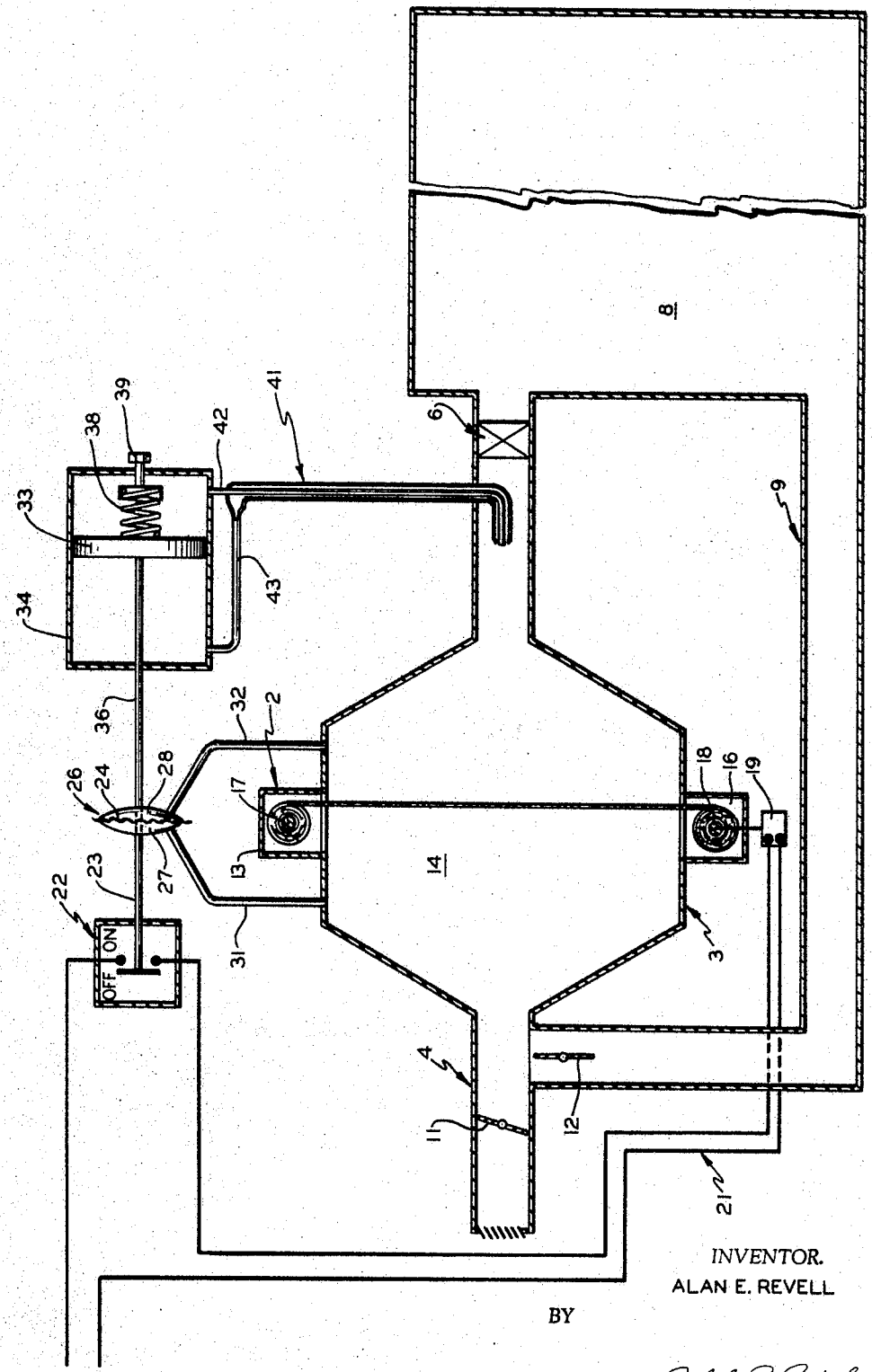

3,332,215
METHOD AND APPARATUS FOR ADVANCING A WEB OF FILTER IN GAS FILTERS
Alan E. Revell, Louisville, Ky., assignor to American Air Filter Company, Inc., Louisville, Ky., a corporation of Delaware
Filed Nov. 1, 1963, Ser. No. 320,641
6 Claims. (Cl. 55—96)

The present invention relates to gas filters of the type wherein filter medium is moved from a supply zone through a gas filtering zone to a take-up zone. More particularly, the present invention relates to an improved method and apparatus for advancing a web of filter medium in such type gas filters.

Various arrangements have been employed in the past to advance filter medium across a gas filtering zone in an attempt to insure efficient filtration and efficient utilization of filter medium. Included among such arrangements have been those which have employed pressure responsive controls adapted to sense pressure changes resulting from filter resistance changes to advance the medium accordingly. For the most part, these pressure responsive arrangements have not always proven accurate or efficient, frequently resulting in either an advance of too much filter medium or else the advance of an insufficient amount of medium for desired conditions. The present invention recognizing the problems of past pressure sensing arrangements, as well as certain of the principal causes therefor, provides an improved pressure sensing method and apparatus for advancing filter medium through a gas filtering zone which eliminates such problems. In effect, the present invention recognizes the fact that the same filter medium advancing arrangement quite often is employed under variable gas flow conditions and, as a result, such an arrangement, which is capable of operating effectively under one preselected set of conditions, is totally ineffective when the conditions are changed. Specifically, the present invention recognizes that pressure sensing arrangements for advancement of filter medium in accordance with filter resistance must be correlated with changes in velocity of the gas stream being treated in order to obtain effective results. With this recognition, the present invention provides an arrangement which calibrates the pressure sensing device in response to prevailing velocity conditions of the treated gas stream.

Various other features of the present invention will become obvious to one skilled in the art upon reading the disclosure set forth herein.

More particularly, the present invention provides an improved method for advancing filter medium through a gas filtering zone comprising the steps of: sensing static pressure differential between a position upstream and a position downstream of the gas filter medium; simultaneously sensing velocity changes in the gas stream being treated; and, advancing the filter medium in accordance with the preselected static pressure differential as calibrated by the sensed velocity changes. In addition, the present invention provides an improved filter medium advance control assembly for gas filter apparatus of the type wherein advance of a web of filter medium from a supply zone thereof to a gas filtering zone is effected by rewinding such filter medium on a rewind spool in a discharge zone comprising: a first means to rotate the rewind spool; a second means responsive to a preselected static pressure differential in the gas filtering zone measured between a position upstream and a position downstream of the filter medium to actuate the first means and advance such filter medium in relation to such pressure differential; and, a third means responsive to variations in the velocity in the gas filtering zone to calibrate the second means in relationship thereto.

It is to be understood that various changes can be made in the arrangement, form and construction of the apparatus described hereinafter and the several steps of the method set forth hereinafter without departing from the scope or spirit of the present invention.

Referring to the drawing which discloses an advantageous embodiment of the present invention:

FIGURE 1 is a schematic disclosure of the present invention incorporated with an air filter arranged to serve an enclosure with a recirculating system.

As can be seen in the drawing, a roll-type filter housing 2 is disclosed as disposed in vertically extending position across plenum 3 of duct 4. Duct 4, which communicates through a suitably louvered intake at one end with outside or ambient air and which has a blower 6 downstream of housing 2, is arranged to communicate at its other end with an enclosure or room 8. A suitable return or recycling duct 9 also is connected to room 8 at one end thereof, the other end being connected to duct 4 upstream filter housing 2. A rotatable damper 11 is provided in duct 4 to control the quantity of outside air delivered to the system at any one time and a rotatable damper 12 is provided in duct 9 to control the quantity of air recirculated from room 8. It is to be understood that, as the settings of the dampers are changed for various conditions (for example, winter to summer adjustment), the velocity pressure of the air stream changes due to changes in resistance of the system. When this occurs, the resistance offered by the filter medium in filter housing 2 will also change, the resistance increasing as the pressure of the gas stream increases.

Referring more specifically to filter housing 2 in the system, it is to be noted that this housing includes top filter medium supply zone 13, central gas filtering zone 14 and bottom filter medium take-up zone 16. Mounted in wound form in supply zone 13 is filter medium supply roll 17. Roll 17 can be comprised of a web of any one of a number of known and suitable filter medium materials. For example, a suitable glass fiber material of interconnected and bonded glass fibers can be used.

In operation, web 17 is advanced incrementally from time-to-time into and through central gas treating zone 14 which frames the gas stream passage and through which the gas to be treated, namely air, must flow. Web 17 is then correspondingly progressively advanced to take up zone 16 where it is wound upon rewind spool 18 into a discharge roll which can be ultimately thrown away or reconditioned for further use.

The novel web advance control system to advance web 17 includes a drive motor 19 coupled to rewind spool 18 by any one of a number of suitable coupling arrangements known in the art and not shown in detail. Drive motor 19 is incorporated as part of electrical circuit 21 which can be connected across a suitable source of electrical power.

Circuit 21 includes "on-off" switch 22 connected by actuating rod 23 to flexible diaphrgam 24 of pressure switch 26. Diaphragm 24 serves to divide the enclosed chamber of switch 26 into two adjacent chambers 27 and 28. Chamber 27 is connected through static pressure conduit 31 to one side of gas filtering zone 14 at a position upstream web 17. Chamber 28 is connected through static pressure conduit 32 to one side of gas filtering zone 14 at a position downstream web 17. Thus, diaphragm 24 and actuating rod 23 attached thereto are moved against spring pressure (as described hereinafter) as the static pressure differential increases between chambers 27 and 28 due to increases in filter resistance. Movement of rod 23 is translated to switch 22 to close this normally open switch and actuate drive motor 19 to advance filter medium 17 in the gas treating zone 14. It is to be noted that switch 22 is maintained in normally open position by virtue of spring loaded calibrating piston 33 slidably disposed in cylinder 34 and attached to diaphrgam 24 by means of piston rod 36. The slidable piston 33 is spring urged by spring 38 which is also disposed in cylinder 34 to move rods 36 and 23 in such direction as to hold switch 22 in normally open or "off" position until the pressure differential between chambers 27 and K8 is sufficient to overcome the force of the spring and move the switch 22 to close or "on" position. In this connection, it also is to be noted that a suitable spring tension adjusting screw and cup assembly 39 is provided at one end of cylinder 34 to adjust the spring tension of spring 38 in accordance with preselected operating conditions.

To calibrate movement of piston 33 in accordance with changed system resistance resulting from a repositioning of dampers 11 and 12, a velocity pressure sensing apparatus 41, comparable to a Pitot tube arrangement, is provided. Apparatus 41 is comprised of co-axially extending inner and outer conduits 42 and 43, respectively. The coaxial end of each of conduits 42 and 43 is positioned in duct 4. The other end of each of the conduits is arranged so that inner conduit 42 is connected to cylinder 34 on that side of piston 33 on which spring 38 is disposed. Outer conduit 43, on the other hand, is connected to cylinder 34 on the opposite side of piston 33. Since inner conduit 42 serves to sense total pressure and outer conduit 43 serves to sense static pressure, the pressure differential, namely velocity pressure, serves to calibrate movement of piston 33 and thus calibrate the diaphrgam 24 and the actuation of switch 22 in accordance with changes of velocity of the gas stream to be treated.

Finally, it is to be noted that the schematic drawing discloses the face area of piston 33 to be substantially larger than that of diaphrgam 24 since the velocity pressure changes measured are small under usual operating range conditions (300 to 600 c.f.m.). It is to be understood that the relative dimensioning and sizes of the equipment can be selected and adjusted by one skilled in the art in accordance with the conditions in which the equipment is to be eventually adapted.

The invention claimed is:
1. A filter medium advance control system for gas filter apparatus wherein advance of a web of filter medium from a supply zone thereof through a gas filtering zone is effected by rewinding said filter medium on a rewind spool in a discharge zone comprising:
 (a) drive means to rotate said rewind spool;
 (b) a differential pressure-sensing control means connected to said drive means, said control means being responsive to a preselected static pressure differential in said gas filtering zone measured between a position upstream and a position downstream said filter medium to actuate said drive means and advance said filter medium in relationship to such pressure differential; and,
 (c) calibrating means connected to said differential pressure-sensing control means responsive to variations in the velocity pressure in said gas filtering zone to calibrate said differential pressure-sensing control means in relationship to the variations in the velocity pressure.

2. The apparatus of claim 1:
 (a) said calibrating means being responsive to variations in the velocity pressure in said gas filtering zone at a position downstream said filter medium.

3. A filter medium advance control system for a gas filter apparatus wherein advance of a web of filter medium from a supply zone thereof through a gas filtering zone is effected by rewinding said filter medium on a rewind spool in a discharge zone comprising:
 (a) an electrical control circuit including a motor coupled to said rewind spool to rotate said spool;
 (b) an "on-off" switch in said circuit to control the energization of said motor;
 (c) a differential pressure-sensing switch connected to said "on-off" switch, said pressure switch being responsive to a preselected static pressure differential in said gas filtering zone measured between a position upstream and a position downstream said filter medium to actuate said "on-off" switch and control the energization of said spool driving motor; and,
 (d) means connected to said pressure switch responsive to variations in the velocity pressure in said gas filtering zone to calibrate said pressure switch in relationship to the variations in the velocity pressure.

4. A filter medium advance control system for a gas filter apparatus wherein advance of a web of filter medium from a supply zone thereof through a gas filtering zone is effected by rewinding said filter medium on a rewind spool in a discharge zone comprising:
 (a) an electrical control circuit including a motor coupled to said rewind spool to rotate said spool;
 (b) an "on-off" switch in said circuit to control the energization of said motor;
 (c) a pressure switch including an enclosed chamber partitioned by a flexible diaphragm disposed in said chamber and connected to said "on-off" switch to actuate the same;
 (d) a first static pressure conduit connecting said enclosed chamber on one side of said flexible diaphragm to a side of said gas filtering zone at a position upstream said filter medium;
 (e) a second static pressure conduit connecting said enclosed chamber on the other side of said flexible diaphragm to a side of said gas filtering zone at a position downstream said filter medium whereby said flexible diaphragm is activated to operate said "on-off" switch in accordance with a preselected static pressure differential between said upstream and downstream positions;
 (f) a calibrating piston connected to said flexible diaphragm; and,
 (g) a velocity pressure conduit connecting said calibrating piston with a mid-stream position of said gas filtering zone downstream said gas filtering medium to actuate said piston and calibrate said diaphragm in accordance with variations in the velocity pressure in said gas filtering zone.

5. A method of advancing filter medium through a gas filter zone comprising the steps of:
 (a) sensing the static presure differential between a position upstream and a position downstream said gas filtering medium with a differential pressure mechanism means;
 (b) simultaneously sensing the velocity pressure variations in said gas stream being treated with a second pressure sensing means which senses the difference between total pressure and static pressure;
 (c) calibrating said differential pressure measurement means in accordance with said sensed velocity pressure variations;
 (d) advancing said filter medium in accordance with a preselected sensed static pressure differential sensed by said differential pressure-sensing means as calibrated by said sensed velocity pressure variations.

6. The method of claim 5, wherein the velocity pressure variations of said gas stream are sensed downstream said filter medium.

References Cited
UNITED STATES PATENTS

| 2,218,453 | 10/1940 | Mickle | 55—354 |
| 2,848,064 | 8/1958 | Gregory | 55—352 X |
| 2,867,324 | 1/1959 | Hirs | 55—354 X |

FOREIGN PATENTS 360,816  4/1962  Switzerland.

HARRY B. THORNTON, *Primary Examiner.*

S. W. SOKOLOFF, *Assistant Examiner.*